US008244245B2

(12) United States Patent
Kobayashi

(10) Patent No.: US 8,244,245 B2
(45) Date of Patent: Aug. 14, 2012

(54) PORTABLE TELEPHONE COMMUNICATION SYSTEM, COMMUNICATION CONTROL METHOD, AND COMMUNICATION CONTROL PROGRAM

(76) Inventor: Tsukasa Kobayashi, Tokyo (JP)

( * ) Notice: Subject to any disclaimer, the term of this patent is extended or adjusted under 35 U.S.C. 154(b) by 765 days.

(21) Appl. No.: 12/280,018

(22) PCT Filed: Jan. 22, 2007

(86) PCT No.: PCT/JP2007/050880
§ 371 (c)(1),
(2), (4) Date: Aug. 20, 2008

(87) PCT Pub. No.: WO2007/097145
PCT Pub. Date: Aug. 30, 2007

(65) Prior Publication Data
US 2010/0167736 A1    Jul. 1, 2010

(30) Foreign Application Priority Data

Feb. 22, 2006    (JP) ................................. 2006-045921

(51) Int. Cl.
*H04W 4/00* (2009.01)
(52) U.S. Cl. .................. 455/435.2; 455/435.1; 455/525; 455/434; 455/515
(58) Field of Classification Search ............... 455/435.1, 455/435.2, 525, 434, 515
See application file for complete search history.

(56) References Cited

U.S. PATENT DOCUMENTS

| 2004/0109431 | A1* | 6/2004 | Abrahamson et al. | 370/342 |
|---|---|---|---|---|
| 2007/0004445 | A1* | 1/2007 | Dorsey et al. | 455/525 |
| 2007/0042775 | A1* | 2/2007 | Umatt et al. | 455/434 |
| 2010/0202283 | A1* | 8/2010 | Tiedemann, Jr. | 370/209 |

FOREIGN PATENT DOCUMENTS

| JP | 7-143544 | A | 6/1995 |
|---|---|---|---|
| JP | 11-75237 | A | 3/1999 |
| JP | 2001008249 | A | 1/2001 |
| JP | 2004235704 | A | 8/2004 |
| JP | 2004297357 | A | 10/2004 |
| JP | 2004343458 | A | 12/2004 |
| JP | 2005051568 | A | 2/2005 |
| JP | 2005086374 | A | 3/2005 |
| JP | 2005130146 | A | 5/2005 |
| JP | 2006295563 | A | 10/2006 |
| WO | 2006106561 | A1 | 10/2006 |

OTHER PUBLICATIONS

International Search Report for PCT/JP2007/050880 mailed Apr. 17, 2007.
Japanese Office Action for JP2008-501643 issued Aug. 30, 2011.
Japanese Office Action for JP2008-501643 issued Jun. 7, 2011.

* cited by examiner

*Primary Examiner* — Barry Taylor
(74) *Attorney, Agent, or Firm* — Michael Dryja

(57) ABSTRACT

A plurality of radio base stations connected to a network are divided into radio base stations of the upper-level version having a specific function and radio base stations of lower-level version not having the specific function. Each portable telephone has a cell selecting function of receiving message information transmitted from each radio base station, detecting the cell having the highest radio quality indicating adequateness to communication from the message information, and selecting the detected cell as the cell to which the portable telephone belongs. The portable telephone is characterized by enabling the user to select either an upper-level version communication mode in which the portable telephone connects and communicates only with the radio base stations of the upper-level version or normal communication mode in which the portable telephone connects and communicates with all the radio base stations.

14 Claims, 8 Drawing Sheets

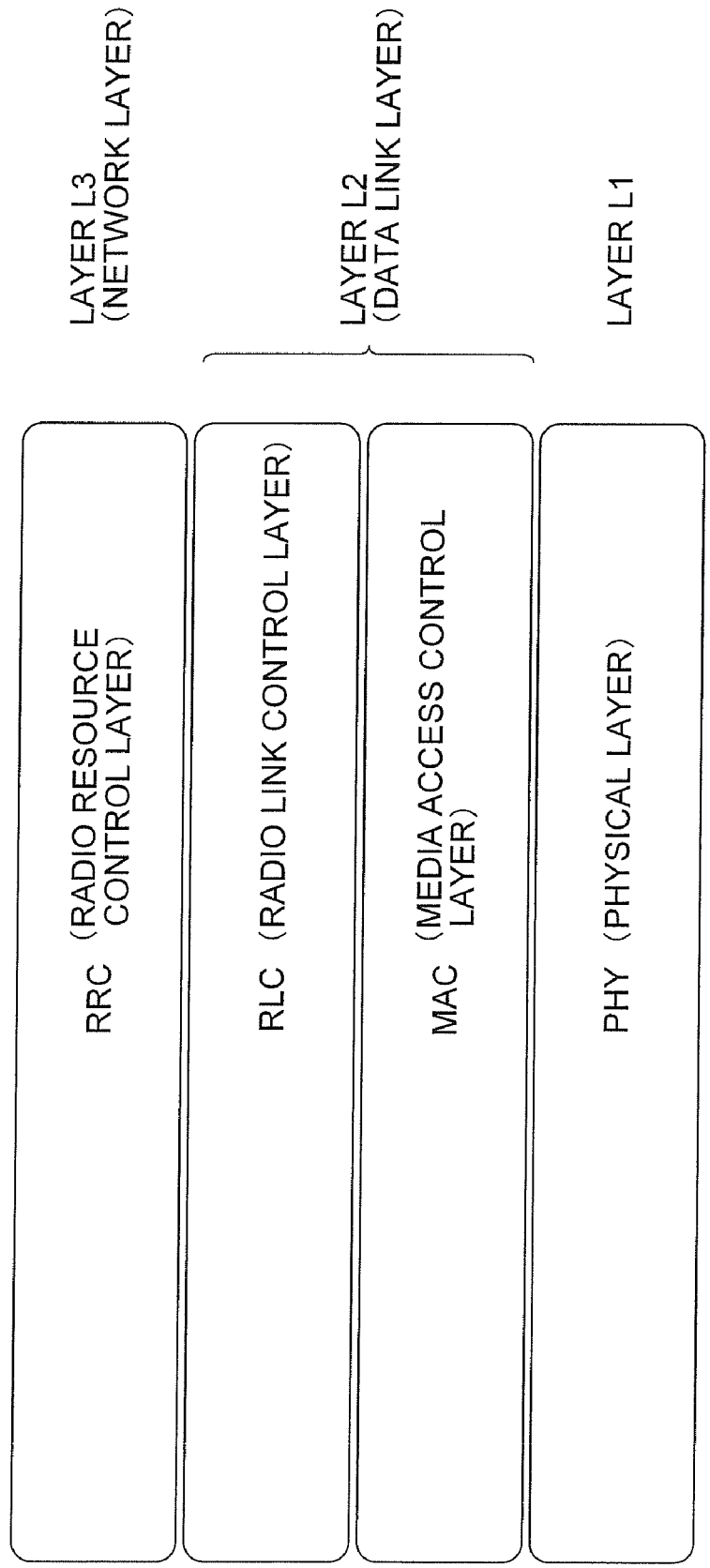

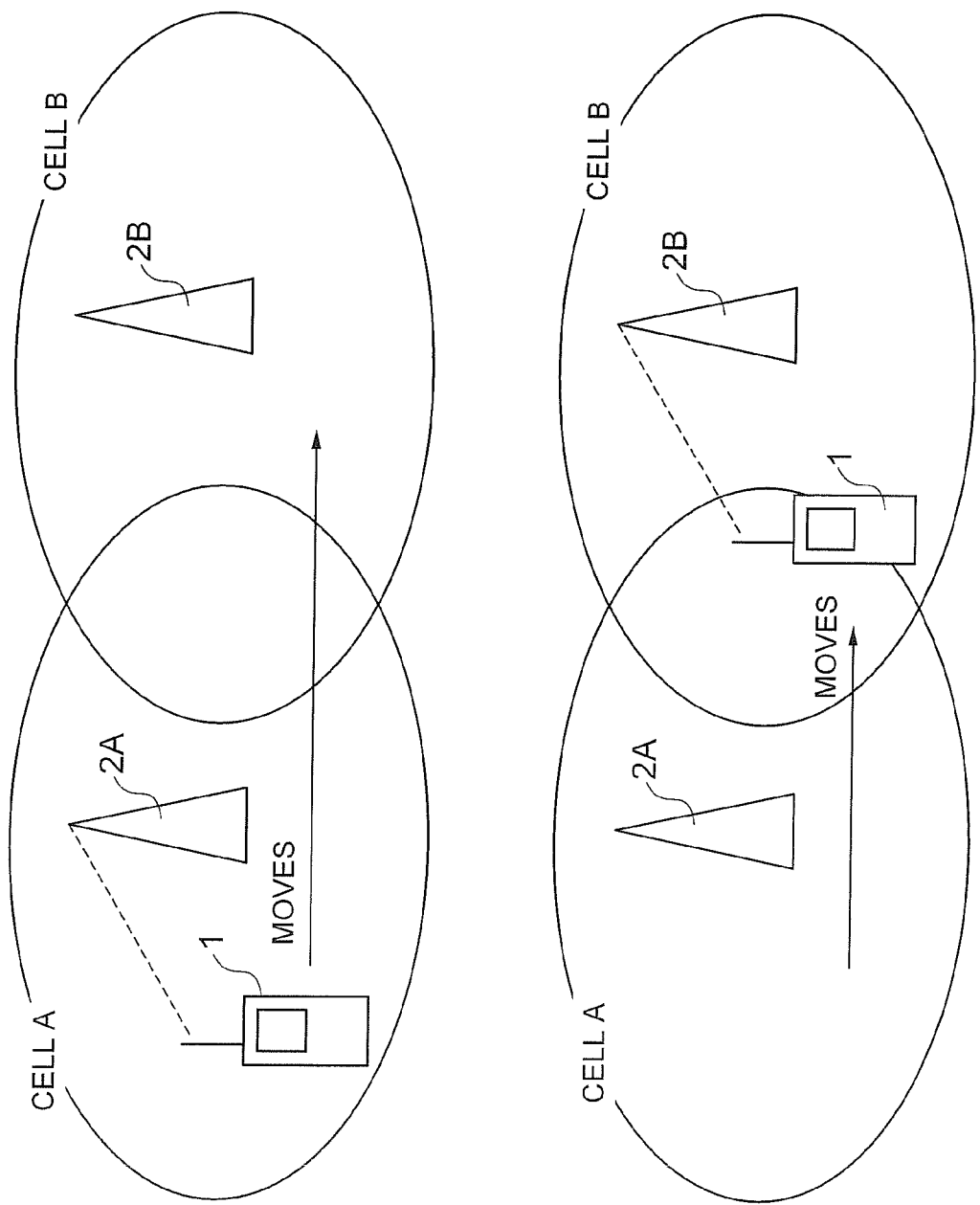

FIG. 4A

CHART 1

| CELL | SCRAMBLING CODE |
|---|---|
| 21 | 100 |
| 22 | 200 |
| 23 | 500 |
| 24 | 900 |
| 25 | 1000 |
| .... | .... |

FIG. 4B

CHART 2

| CELL | SCRAMBLING CODE OF OBJECT CELL |
|---|---|
| 1 | 200 |
| 2 | 900 |

FIG. 4C

CHART 3

| CELL | SCRAMBLING CODE OF CELL | SPECIFYING OF CODE LIST |
|---|---|---|
| 21 | 100 | |
| 22 | 200 | ※ |
| 23 | 500 | |
| 24 | 900 | ※ |
| 25 | 1000 | |

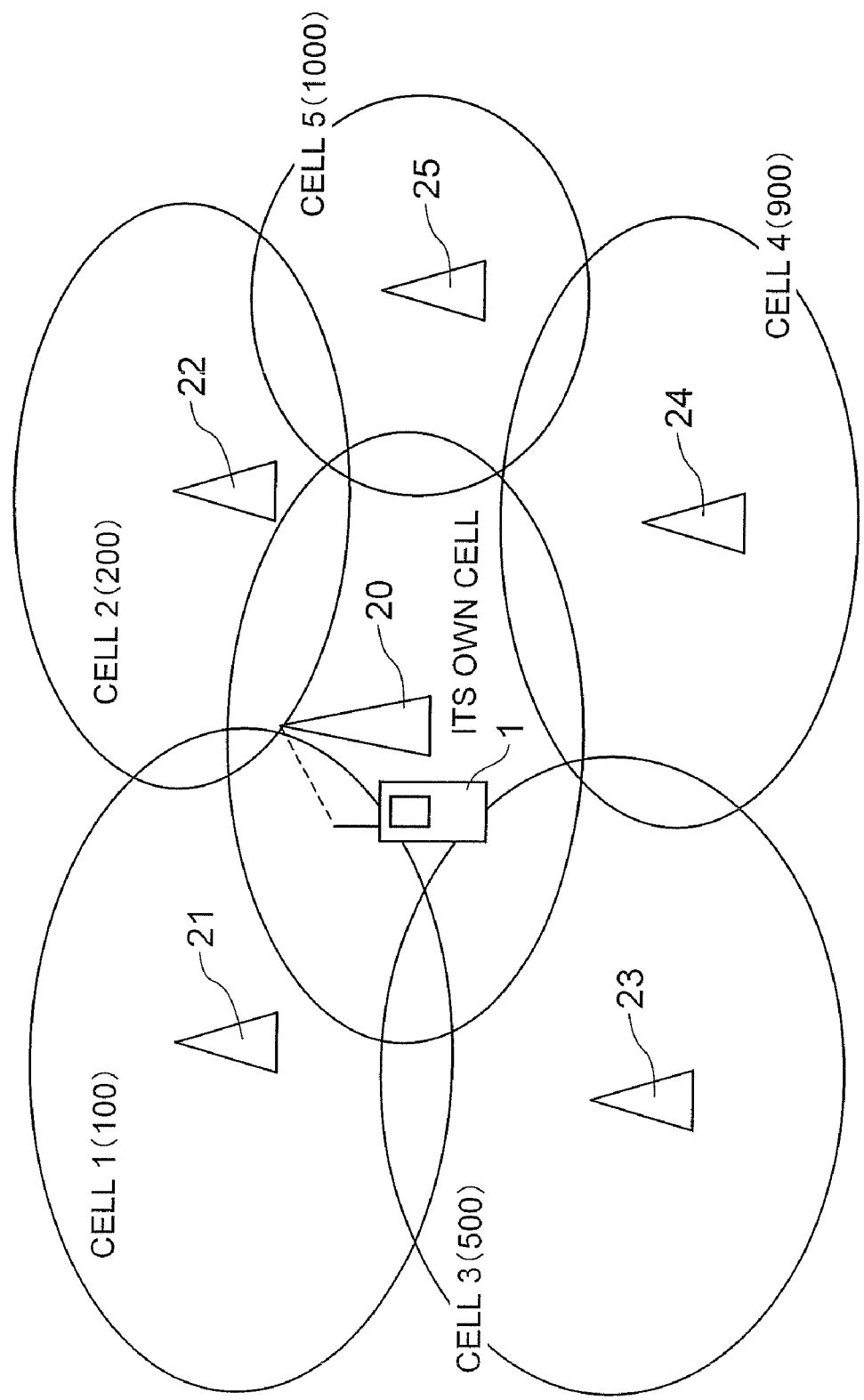

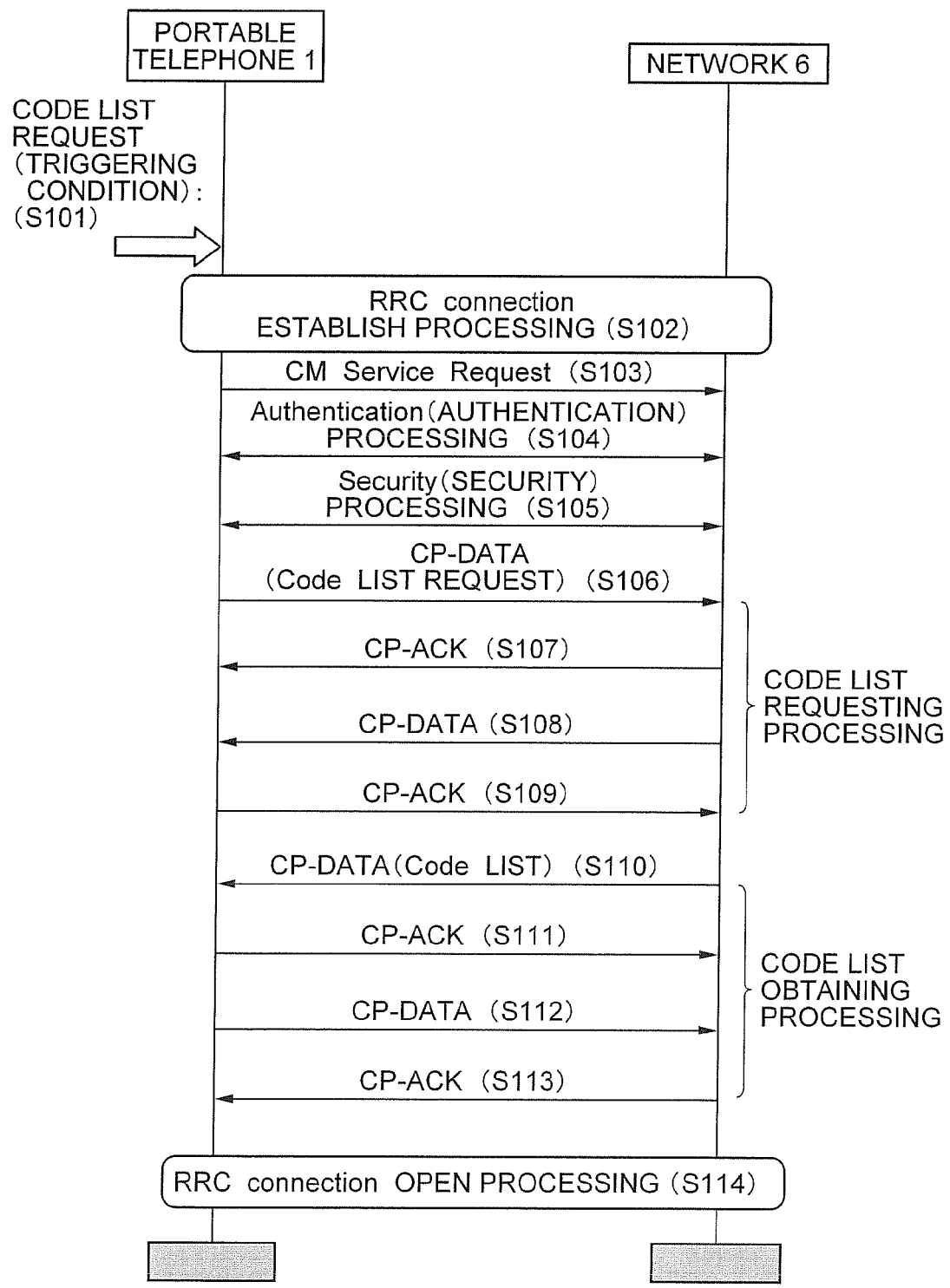

PORTABLE TELEPHONE COMMUNICATION SYSTEM, COMMUNICATION CONTROL METHOD, AND COMMUNICATION CONTROL PROGRAM

TECHNICAL FIELD

The present invention relates to a potable telephone communication system, and more particularly, relates to a portable telephone communication system in which it is capable of selecting a cell to which the portable telephone connects depending on the function, and a communication control method and a communication control program used in the potable telephone communication system.

BACKGROUND ART

A version of 3G (third-generation) W-CDMA (Wideband-Code Division Multiple Access) system is upgraded from Release99 to Release5 and to Release6. As the version is upgraded, new function is added thereto.

In recent years, the system transition from Release99 to Release5 has been expected, and it has been supposed that a new function of Release5, such as a HSDPA (High Speed Downlink Packet Access), is to be put into practice.

However, it is difficult, from the cost standpoint, for a system operator to upgrade all base stations so as to be corresponding to the new function (Release5) at once. Therefore, in the case of upgrading version of a system, the system is normally formed in the state including both a base station which is corresponding to functions of existing Release99 only and a base station which is corresponding to Release5 having a new function. In this case, if a user desired to use an application which is used in the HSDPA, it is more convenient for the user of a portable telephone to connect to only the base station corresponding to Release5.

With respect to the W-CDMA being a traditional art, as an example in which the feature of cells is determined at a mobile station end so as to perform a selection of a cell, there is a system in which cellular cells and Hot-spot cells exist in mixed. In the system, a mobile station has a table which is the same as a scramble code table provided in a base station, and the cell environment is identified according to the scramble code (see Patent Literature 1). Further, there is an example in which neighboring cell information notified from the base station to the mobile station is ranked for detecting and monitoring of cells, and the necessity of detecting and monitoring of cells and contents of service to be provided are included in the ranking (see Patent Literature 2).

Patent Literature 1: Japanese Patent Application Laid-open No. 2005-86374

Patent Literature 2: Japanese Patent Application Laid-open No. 2005-51568

DISCLOSURE OF THE INVENTION

In the traditional W-CDMA system, a portable telephone receives, from the network, neighboring cell information concerning all cells neighboring the cell to which the portable telephone is being connected.

However, information concerning whether or not each cell is a cell belonging to a radio base station having a new function is not included in the neighboring cell information. Consequently, a system capable of selecting a cell belonging to the radio base station having a new function so as to connect thereto has not been achieved at present. In the related art as described above, therefore, it has been impossible for the portable telephone to obtain information about the cell belonging to the radio base station having a new function from the network and to easily select either communication with the cell belonging to the radio base station having a new function or communication with all cells including the radio base station.

SUMMARY OF THE INVENTION

It is therefore an object of the present invention to solve the problems as described above, and to provide a portable telephone communication system which enables the portable telephone to obtain information from the network about the cell belonging to the radio base station having a new function and select either communication with only a cell belonging to the radio base station having a new function or communication with all cells, a communication control method used in the portable telephone system and a communication control program used therefor.

In order to achieve such an object, a portable telephone communication system according to the present invention includes a plurality of radio base stations, connected to a network, having a notified information transmitting function of transmitting notified information which includes cell information managed by neighbor radio base stations to unspecific number of portable telephones, and each of portable telephones having a cell selecting function of selecting a suitable cell as a cell to which the portable telephone itself belongs on the basis of radio quality indicating suitability for communication obtained from the received notified information. Further, the plurality of radio base stations as described above include both a radio base station of an upper-level version having a specific function and a radio base station of a lower-level version not having the specific function. Each portable telephone has a mode selecting and setting function which enable the user to select either an upper-level version communication mode in which the radio base station of the upper-level version is an object of connection or a normal communication mode in which all of the radio base stations of the upper and lower-level versions are object of connection.

Thereby, in the portable telephone communication system according to the present invention, it is capable of selecting and performing either the communication in which the radio base station of the upper-level version having a new function is an object of connection or the normal communication in which all radio base stations are object of connection with each portable telephone.

Here, each portable telephone has a code list requesting function of requesting a scrambling code list including a scramble code of the cell belonging to the radio base station of the upper-level version from a network to which each radio base station is connected. Further, each portable telephone has a code list receiving function of receiving the scrambling code list transmitted from the network.

In the result, it becomes possible to request the scrambling code list to the network from the portable telephone end when it is needed, and also it becomes possible for the user of each portable telephone to collect information concerning radio base stations of old and new versions via the portable telephone.

Moreover, each portable telephone has a code list managing function of managing neighboring cell information obtained from the notified information and the scrambling code list.

Thereby, the portable telephone is capable of holding the information of the radio base stations of the upper-level version and all radio base stations so as to manage them together routinely.

Further, each portable telephone has an upper-level version communication mode selecting function of changing mode so as to be able to measure radio quality of the cell specified in the scrambling code list by a physical layer which measures radio quality, for going into the upper-level version communication mode, when the portable telephone which is connected at first to the radio base station in the normal communication mode receives the scrambling code list transmitted from the network.

Thereby, the portable telephone is capable of selecting a destination to be connected on the basis of radio quality of the cell belonging to the base station of the upper-level version and going into the upper-level version communication mode.

Moreover, each portable telephone has a non-detection time normal communication mode selecting function of measuring radio quality of the neighboring cells included in neighboring cell information which is obtained from the notified information so as to go into the normal communication mode when the cell specified in the scrambling code list is not found in measuring radio quality of the cell specified in the scrambling code list for going into the upper-level version communication mode.

Thereby, even if the cell specified in the scrambling code list is not found and the portable telephone cannot go into the upper-level version communication mode, it is possible to go into the normal communication mode immediately, so that there is no possibility of the interruption of communication and the like.

Further, each portable telephone has a normal communication mode selecting function of canceling measurement of radio quality of the cell specified in the scrambling code list and measuring radio quality of the neighboring cells included in the neighboring cell information so as to go into the normal communication mode, when the upper-level version communication mode is desired to be terminated.

Thereby, when it is desired to go into the normal communication mode at the portable telephone end, it is capable of canceling the upper-level version communication mode and going into the normal communication mode immediately.

Further, the portable telephone communication system employs a W-CDMA (Wideband-Code Division Multiple Access) system as a communication system.

Thereby, corresponding to upgrading version in the W-CDMA system, it is possible to respond to communication in the area where the base station of the upper-level version and the base station of the lower-level version exist in mixed.

Further, a communication control method in a portable telephone communication system according to the present invention includes a plurality of radio base stations connected to a network, and one or more portable telephones connecting to one of the radio base stations so as to perform radio communication, where the plurality of radio base stations include a base station of an upper-level version having a specific function and a base station of a lower-level version not having the specific function. The method includes: a code list requesting step in which each portable telephone requests a scrambling code list of a cell belonging to the base station of the upper-level version for the network via the cell to which the portable telephone itself belongs; a code list receiving step in which each portable telephone receives the scrambling code list; a specified cell radio quality measuring step in which each portable telephone measures radio quality indicating suitability for communication of the cells specified in the scrambling code list; and a specified cell selecting step in which each portable telephone selects a cell having the highest radio quality as a cell to which the portable telephone itself belongs from the cells specified in the scrambling code list.

Thereby, the communication control method in the portable telephone communication system in which the portable telephone is capable of searching the cells belonging to the radio base station of the upper-level version, selecting a destination to be connected on the basis of the radio quality of the cells, and going into the upper-level version communication mode, can be obtained.

Here, an updated neighboring cell information managing step in which the portable telephone manages both the neighboring cell information obtained from the notified information including cell information transmitted from the radio base station to the portable telephone and the received scrambling code list, may be provided after the code list receiving step.

Consequently, under the normal communication control processing, each portable telephone is capable of routinely managing information of the radio base station of the upper-level version and all radio base stations without particularly conscious input by the operator.

Further, in the communication control method in the portable telephone communication system, a radio quality re-measuring step of re-measuring the radio quality of the neighboring cells included in the neighboring cell information obtained from the notified information, which is functioned when the portable telephone cannot find the object cell in the specified cell radio quality measuring step, and a neighboring cell reselecting step in which the portable telephone selects a suitable cell as a cell to which the portable telephone belongs on the basis of the radio quality measured in the radio quality re-measuring step, may be provided.

Thereby, in the case where the portable telephone cannot find the cell specified in the scrambling code list and go into the upper-level version communication mode, it is possible to go into the normal communication mode immediately without performing new setup or the like.

Further, a cell measurement cancellation instructing step of canceling the measurement of the specified cell, which functions when it is desired to cancel the specified cell radio quality measuring step or when it is desired to cancel the connecting state with the cell specified in the scrambling code list after performing the specified cell radio quality measuring step, when the instruction therefor is input, may be provided.

Consequently, the communication control method in the portable telephone communication system capable of canceling the upper-level version communication mode so as to go into the normal communication mode immediately when it is desired to go into the normal communication mode at the portable telephone side, can be obtained.

Further, a communication control program in a portable telephone communication system according to the present invention for causing a computer to execute, by each portable telephone which is being a part of the portable telephone communication system including a plurality of radio base stations and the plurality of portable telephones, a neighboring cell radio quality measuring function of measuring radio quality of neighboring cells included in neighboring cell information obtained from notified information received from radio base station, and a neighboring cell selecting function of selecting a suitable cell as a cell to which the portable telephone itself belongs on the basis of the measured radio quality, the communication control program causes a computer to execute: a code list requesting function of requesting a scrambling code list (including a scrambling code) of the cell belonging to a radio base station of the upper-level version for a network to which the radio base station is connected; a specified cell radio quality measuring function of measuring radio quality of the cells specified in the scrambling code list transmitted from the network; and a specified cell selecting function of selecting a suitable cell as a cell to which the portable telephone itself belongs from the cells specified in the scrambling code list on the basis of the measured radio quality.

Thereby, the communication control program in the portable telephone communication system in which each portable telephone is capable of going into the upper-level version communication mode by searching cells belonging to the radio base station of the upper-level version and selecting a destination to be connected on the basis of the radio quality of the cells, and, is capable of going into the normal communication mode immediately in the case where the radio base station of the upper-level version is not found or the upper-level version communication mode is desired to be cancelled, can be obtained.

Here, the communication control program may cause a computer to execute an updated neighboring cell information managing function of managing the neighboring cell information obtained from the notified information received from the radio base station and the received scrambling code list.

Further, the communication control program may cause a computer to execute a neighboring cell measurement returning function of returning to the measurement executed by the neighboring cell radio quality measuring function, the neighboring cell measurement returning function being functioned when the object cell is not found in executing the specified cell radio quality measuring function of the control program in the portable telephone, or measurement by the specified cell radio quality measuring function is desired to be cancelled.

EFFECTS OF THE INVENTION

According to the present invention, it becomes possible for a portable telephone to obtain information of the cell belonging to the radio base station having a new function from the network and to analyze, based on the information, the contents of communication for only the cell belonging to the radio base station having a new function (upgraded) and communication for all cells so as to select and connect either of them. In the result, even if new functions are provided in the communication system of the radio base station, a superior portable telephone communication system in which the portable telephone is capable of switching and connecting easily either of radio base stations of old or new version so as to correspond it, a communication control method thereof and a communication control program therefor, can be achieved.

BEST MODE FOR CARRYING OUT THE INVENTION

Hereinafter, an exemplary embodiment of the invention will be explained with reference to the drawings.

FIG. 1 shows an entire configuration of a portable telephone communication system 10 according to this exemplary embodiment. The portable telephone communication system 10 shown in FIG. 1 is configured based on an IMT-2000 (W-CDMA) system and includes a portable telephone 1 of a user, a plurality of radio base stations 2 for performing radio communication with the portable telephone 1, and a radio network controller (RNC) 3 provided for overall-controlling the plurality of radio base stations 2. A core network (CN) 4 for managing location registration control, call control, and user information is arranged and connected to the radio network controller 3. The core network 4 includes a multimedia signal processing device 4A for performing core processing of the core network 4.

Here, a cell is defined as an area where each radio base station 2 can cover. Since a plurality of portable telephones 1 can be located within the cell, each radio base station 2 distinguishes these portable telephones 1 by means of identifier. The radio network controller 3, the core network 4, a functional server associated with the core network 4 and the like are collectively referred to as a network 6.

In this exemplary embodiment, each of the plurality of radio base stations 2 has a notified information transmitting function of transmitting notified information including cell information managed by neighbor radio base stations to unspecific number of the portable telephones 1. Each portable telephone 1 measures radio quality indicating suitability for communication of neighboring cells in its physical layer on the basis of the transmitted notified information and has a cell selecting function of selecting a suitable cell as a cell to which the portable telephone itself belongs on the basis of the measured radio quality.

Here, the plurality of radio base stations 2 are divided into a radio base station of an upper-level version having a specific function and a radio base station of a lower-level version not having the specific function. Meanwhile, each portable telephone 1 has a mode selecting and setting function of selecting and setting either communication mode, that is, an upper-level version communication mode in which only the radio base station of the upper-level version is an object of connection or a normal communication mode in which all radio base stations 2 including the radio base station of the upper-level versions and the radio base station of the lower-level versions are object of connection, in communicating.

FIG. 2 shows a protocol structure of a radio interface supposed in the W-CDMA system. The protocol structure includes a physical layer (PHY) which is a layer L1, a data link layer which is a layer L2, and a network layer which is a layer L3. A service provided from a lower layer to an upper layer and a service access point for providing the service are defined between the respective layers of L1 to L3. At the service access point between the layer L3 and the layer L2, a logical channel is defined. At the service access point between the layer L2 and the layer L1, a transport channel is defined. Further, a physical channel is defined as a channel for performing an internode communication of the layer L1.

The data link layer of layer L2 is divided into two sub-layers: a radio link control layer (RLC) for controlling a radio link; and a media access control layer (MAC) for performing allocation and control of radio resource, etc. The layer L3 is composed of a radio resource control layer (RRC) etc. for controlling the layer L2 directly. Control of radio quality measurement is performed when the radio resource control layer (RRC) L3 instructs to the physical layer (PHY).

Hereinafter, this will be explained more in detail.

When the portable telephone 1 is powered-on, for example, the portable telephone 1 performs a frequency retrieval and a scrambling code retrieval initially and selects a suitable cell (which is an area covered by each of the radio base stations 2). Then, the portable telephone 1 receives notified information transmitted from the radio base station 2. In the notified information, various settings such as a channel setting to be used when the portable telephone 1 is in the standby time are stored. In "System Information Block Type 11" included in the notified information, information of neighboring cells is stored. Meanwhile, in the case where the portable telephone 1 is in the communication state, that is, not in the standby time, the neighboring cell information can be received in even a measurement control message.

The portable telephone 1 measures radio quality (for example, received power and the like) of the neighboring cells by using the received neighboring cell information. On the basis of the measurement result, a cell selecting (Cell Reselection) processing is performed.

The cell selecting processing will be explained by using an illustration diagram in FIG. 3.

When the portable telephone 1 is located in a cell A, the portable telephone 1 receives notified information which is notified from a radio base station 2A of the cell A usually. In the "System Information Block Type 11" in the notified information, information of a cell B and the like is stored as the neighboring cell information. The portable telephone 1 measures radio quality (power) of the cell A and the cell B at all times. If the portable telephone 1 moves and determines that power of the cell B is stronger than that of the cell A, the portable telephone 1 selects the cell B belonging to a radio base station 2B. This operation is called a cell selecting processing.

The processing as described above, practically, may be performed to cause a computer incorporated in the portable telephone 1 to execute a neighboring cell radio quality measuring program and a neighboring cell selecting program.

The "System Information Block Type 11" in the notified information is capable of storing up to 32 pieces of cell information concerning cells having the same frequency, in this exemplary embodiment. Further, cells are characterized by the scrambling code and the frequency so as to be discriminated. Also, with respect to cells having different frequency, up to 32 pieces of cell information can be stored. FIG. 4A shows an example of the neighboring cell information (see FIG. 5).

In a chart 1 shown in FIG. 4A, all cells are not discriminated and the scrambling codes corresponding to respective cells are shown equally.

FIG. 5 shows a situation of the neighboring cells in this case. The portable telephone 1 is capable of selecting all neighboring cells from cells 21 to 25 including its own cell 20. The portable telephone 1 selects a suitable cell from these cells by the cell selecting processing.

A version of 3G (third-generation) W-CDMA (Wideband-Code Division Multiple Access) system is upgraded to Release99, Release5 and Release6, and new functions are added as the version is upgraded.

As described above, a version of the software used in the 3G (third-generation) W-CDMA (Wideband-Code Division Multiple Access) system is upgraded from Release99 to Release5, and to Release6. New functions are added as the version is upgraded. In recent years, it is expected the transition from Release99 system to Release5 system. In the Release5, new functions such as a HSDPA (High Speed Downlink Packet Access) are supposed to be operated.

As described above, in fact, it is difficult, from the cost standpoint, for a system operator to change all base stations so as to be corresponding to Release5 at once. Under such circumstances, a system is formed in the state that the radio base stations corresponding to only a function of Release99 being an existing software and the radio base stations corresponding to Release5 having a new function exist in mixed.

Even in this case, however, the neighboring cell information stored in the "System Information Block Type 11" in the notified information does not include information concerning whether or not the radio base station 2 covering the cell has a new function (whether or not the radio base station 2 corresponds to Release5).

Consequently, by receiving the scrambling code list of the cells belonging to the radio base stations which correspond to the new function, from the network operator, and by measuring radio quality (power) of only the cell which is included in the scrambling code list, in the neighboring cell information received from the "System Information Block Type 11", communication specifically for the base station having the new function can be performed.

In order to obtain the scrambling code list, the portable telephone 1 has a code list requesting function of transmitting a request message to a network. The request message may be started upon such a triggering condition that a user of the portable telephone 1 selects a scrambling code list request from a MENU button, for example.

As a form of the request message, any forms may be acceptable. If an existing message is to be used, an SMS (Short Message Service) message or a REGISTER message being a request message of an SS (Supplementary Service) and the like is included.

Transmission of the request message is performed by causing a computer of the portable telephone 1 to execute a code list requesting program. When the network 6 receives the request message for the scrambling code list, the network 6 transmits the scrambling code list to the portable telephone 1, on the basis of a code list transmitting function provided therein in advance. Reception of the request message is performed by causing a computer of the network 6 to execute a code list request receiving program, and transmission of the scrambling code list is performed by causing a computer of the network 6 to execute a code list transmitting program.

[Operation for Obtaining Scrambling Code List]

Here, operation for obtaining the scrambling code list, which is being a main part of the communication control method in the portable telephone communication system as described above, will be explained.

FIG. 6 shows an example of sequence for obtaining the scrambling code list by using the existing SMS message. Hereinafter, referring to FIG. 6, a process in which the portable telephone 1 obtains the scrambling code list from the network 6 by using the SMS message will be explained.

In FIG. 6, for example, with using an instruction from a user via operation of MENU button as a triggering condition, the portable telephone 1 goes into a processing for requesting the scrambling code list to the network 6 (S101: code list requesting step).

Thereby, an establishment processing of a normal connection is performed by the radio resource control layer (RRC) working as a radio resource controller (S102). As the first of that, service request for connection management (CM: Connection Management) for the network 6 is performed by the portable telephone 1 (S103).

In response to this, an authentication processing with which the network 6 confirms the validity of the portable telephone 1 which accesses thereto on the basis of information of a base station identifier included in the received request and the portable telephone 1 confirms the validity of the network 6 to which it accesses, is mutually performed (S104). Further, a security processing is performed to prevent control signal and user information from being illegally monitored in the radio zone (S105).

After the authentication processing and the security processing are performed, the portable telephone 1 requests the scrambling code list for the network 6 in the form of a CP (control protocol)-DATA signal (S106: code list requesting step).

In response to this, the network 6 returns a CP-ACK (acknowledgement) signal (S107), and also the network 6 returns the CP-DATA signal indicating that the scrambling code list request is acknowledged (S108). Meanwhile, the portable telephone 1 also transmits the CP-ACK signal to the network 6 (S109). By the sequence from S106 to S109, the code list request processing for requesting the scrambling code list is performed.

Subsequently, the network 6 transmits the scrambling code list as the CP-DATA signal to the portable telephone 1 (S110: code list transmitting step). After that, the portable telephone 1 returns the CP-ACK (acknowledgement) signal (S111), and also transmits the CP-DATA signal indicating that the scrambling code list is received (S112: code list receiving step). On the other hand, the network 6 returns the CP-ACK signal (S113). By the sequence from S110 to S113, the code list obtaining processing for obtaining the scrambling code list is performed.

By following the process as described above, when the portable telephone 1 receives the scrambling code list, an open processing of connection is performed on the basis of the connection processing by the RRC (radio resource controller) (S114), thereby, the sequence for obtaining the scrambling code list is completed.

In the series of sequence, a code list requesting program, executed by a computer of the portable telephone 1, is used for requesting the code list, and a code list receiving program, executed by a computer of the portable telephone 1, is used for receiving the code list respectively. A code list request receiving program, executed by a computer of the network 6, is used for receiving the code list request, and a code list transmitting program, executed by a computer of the network 6, is used for transmitting the code list respectively.

Chart 2 of FIG. 4B shows an example of the scrambling code list obtained in a manner described above. The portable telephone 1 combines the neighboring cell information shown in chart 1 of FIG. 4A and information of the scrambling code list shown in chart 2 of FIG. 4B so as to configure and manage updated neighboring cell information in which the cells, as shown in chart 3 of FIG. 4C, belonging to the radio base station 2 having a new function are marked. In other words, the portable telephone 1 performs an updated neighboring cell information managing step.

For configuring and managing the updated neighboring cell information, an updated neighboring cell information managing program, executed by a computer of the portable telephone 1, may be used, for example.

The portable telephone 1 measures radio quality (power) of only the cells marked in chart 3 of FIG. 4C. In the result, as cells not included in the scrambling code list are not measured, the cells do not become the object to be selected by the portable telephone 1.

Therefore, communication for only the cells belonging to the radio base station 2 having a new function comes to be performed. That is, the portable telephone 1 selects and sets an upper version communication mode, and it is performed by an upper version mode selecting function of the portable telephone 1. Thereby, the portable telephone 1 goes into the upper version communication mode from the normal communication mode.

Here, for measuring radio quality (power) of the cells belonging to the radio base station 2 having a new function, a specified cell radio quality measuring program, executed by a computer of the portable telephone 1, is used (specified cell radio quality measuring step).

FIG. 7 shows a situation of the neighboring cells in this case. For the portable telephone 1, a cell 2 and a cell 4 are object of radio quality (power) measurement and are being selectable. The radio resource control layer (RRC) of the portable telephone 1 instructs the physical layer (PHY) to select a cell determined as a cell to which the portable telephone 1 belongs from these cells (specified cell selecting step). FIG. 7 shows an example in which the cell to which the portable telephone belongs is not the cell belonging to the radio base station 2 having a new function.

For selecting the cell, a specified cell selecting program, executed by a computer of the portable telephone 1, is used.

In the explanation as described above, the cells belonging to the radio base station having a new function and the cells belonging to the radio base station not having the new function are discriminated. However, in any other cases, when the types of the base stations need to be discriminated, it may be possible to use the same method.

For example, when a specific portable telephone is to be used in a specific area in such a case of renting a portable telephone in an exhibition hall, an event site and the like, the portable telephone receives a scrambling code list from a network. The scrambling code list includes information of a cell (radio base station) capable of covering a specific area.

As described above, restriction in selecting cells is performed by restricting the object of radio quality (power) measurement. Radio quality measurement is controlled by the instruction of the radio resource control layer (RRC) for the physical layer (PHY).

FIG. 8 shows a process in which the radio resource control layer (RRC) requests radio quality measurement to the physical layer (PHY).

In FIG. 8, the radio resource control layer (RRC) preliminary obtains a neighboring cell list including its own cell to which it belongs (S201). The scrambling codes indicated in the neighboring cell list are 100, 200, 500, 900 and 1000, for example. By showing the scrambling codes, the radio resource control layer (RRC) instructs the physical layer (PHY) to measure radio quality of the cells included in the neighboring cell list for communication settings (S202). The physical layer (PHY) measures radio quality of each cell in response to the instruction and transmits the measurement result indicating that a suitable cell is a cell to which it belongs, to the radio resource control layer (RRC) on the basis of the measured radio quality (S203).

The radio resource control layer (RRC) selects the cell to which it belongs on the basis of the result, and obtains the scrambling code list from the network 6 via the selected cell, by using the processing method executed as shown in FIG. 6 (S204). The scrambling codes indicated in the scrambling code list are 200 and 900, for example. The radio resource control layer (RRC) instructs the physical layer (PHY) to measure radio quality of the cells included in the scrambling code list by showing the scrambling code list (S205). The physical layer (PHY) measures radio quality of each cell in response to the instruction and transmits the measurement result indicating the cell having the highest radio quality (power) to the radio resource control layer (RRC) (S206).

By the way, with respect to measurement of radio quality of a cell, there are various cases. The first case is as follows. The cells of 200 and 900 being the specified scrambling codes may not be found in the result of the radio quality measurement of the cells by the physical layer (PHY) (S207). In fact, this case occurs frequently. In such a case, the physical layer (PHY) transmits the result as a radio quality measurement report to the radio resource control layer (RRC) (S208).

On the assumption of the foregoing case, each portable telephone 1 has a non-detection case normal communication mode selecting function of measuring radio quality of the neighboring cells included in the neighboring cell information obtained from the notified information so as to go into the normal communication mode in the case where the cell specified in the scrambling code list is not found in measuring radio quality of the cell specified in the scrambling code list for going into the upper version communication mode.

Further, the second case is as follows. Cancellation of radio quality measurement in accordance with the scrambling code list may be requested. That is, cancellation of the upper version communication mode in which only the upper version base station is an object of connection may be requested (S209).

On the assumption of the foregoing case, each portable telephone 1 has a normal communication mode selecting function of canceling radio quality measurement of the cell specified in the scrambling code list and measuring radio quality of the neighboring cells included in the neighboring cell information so as to go into the normal communication mode when the upper-level version communication mode is desired to be cancelled.

In the first and the second cases, in fact, the radio resource control layer (RRC) instructs anew the physical layer (PHY) to measure radio quality of the cells included in the neighboring cell list (S210). The physical layer (PHY) measures radio quality of each cell included in the neighboring cell list in response to the instruction, and transmits the measurement result indicating that a suitable cell is a cell to which the portable telephone 1 belongs to the radio resource control layer (RRC) on the basis of the measured radio quality (S211), thereby, the portable telephone 1 goes into the normal communication mode.

For measuring radio quality of cells included in the neighboring cell list and selecting a cell, a neighboring cell measurement returning program, executed by a computer of the portable telephone 1, is used.

As described above, in the portable telephone communication system according to the present invention, each portable telephone has a code list requesting function of requesting the scrambling code list to the network, a code list receiving function of receiving the scrambling code list transmitted from the network, and a code list managing function of managing both the neighboring cell information obtained from notified information and the scrambling code list.

Further, each portable telephone has an upper version communication mode selecting function of instructing the physical layer (PHY) measuring radio quality to change the measurement so as to measure radio quality of only the cell specified in the scrambling code list in the case where the radio resource control layer (RRC) receives the scrambling code list transmitted from the network, and also has a non-detection case lower version communication mode selecting function, in the radio resource control layer (RRC), of instructing the physical layer (PHY) to measure radio quality of the neighboring cells on the basis of the neighboring cell information obtained from the notified information as usual in the case where the physical layer (PHY) measuring radio quality cannot find the cell specified in the scrambling code list.

Moreover, each portable telephone has a lower version communication mode selecting function of instructing the physical layer (PHY) to measure radio quality of the neighboring cells on the basis of the neighboring cell information obtained from the notified information as usual in the case where the radio resource control layer (RRC) cancels the radio quality measurement of only the cell specified in the scrambling code list.

In the result, the portable telephone communication system according to the present invention is capable of easily selecting either communication for only a cell belonging to the upper version base station having a new function or communication for all cells and configuring a communication system for either base stations even if the base stations having respective functions of old and new exist in mixed, and it has a nonconventional and beneficial effect.

In the description as described above, the portable telephone communication system has been mainly explained. A communication control method and a communication control program used for the system are also object of the present invention.

INDUSTRIAL APPLICABILITY

As the present invention is configured as described above, in the case where base stations having a new function and base stations not having that are included in a plurality of base stations, the present invention can achieve the portable telephone communication system effectively used therein and has wide applicability in the field of portable telephone communication.

BRIEF DESCRIPTION OF THE DRAWINGS

FIG. 2 is an illustration diagram showing a protocol structure of a radio interface supposed in the portable telephone communication system shown in FIG. 1;

FIG. 3 is an illustration diagram showing a cell selecting processing of the portable telephone shown in FIG. 1;

FIGS. 4A-4C are charts showing cells of respective radio base stations and scrambling codes, FIG. 4A is chart 1 showing a correspondence relationship between neighboring cell information and the scrambling codes, FIG. 4B is chart 2 showing an example of the requested cell information and the corresponding scrambling codes as transmitted, and FIG. 4C is chart 3 showing an example of a combination of the neighboring cell information in chart 1 and the information of the scrambling code list in chart 2;

FIG. 5 is an illustration diagram showing a relationship between the portable telephone and the neighboring cells in the case of FIG. 3;

FIG. 6 is a sequence diagram showing the process for obtaining the scrambling code list in the present invention;

Figure 1:
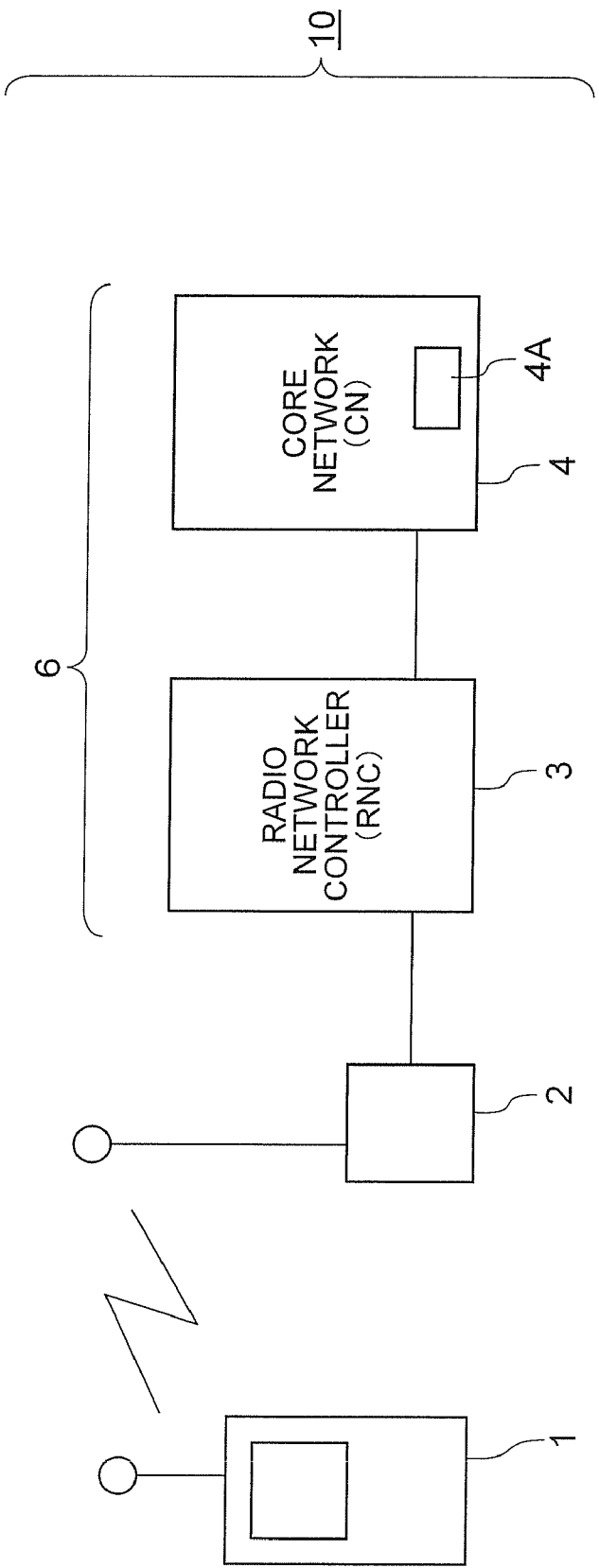
FIG. 1 is a block diagram showing a configuration of a portable telephone communication system according to the present invention.
Figure 7:
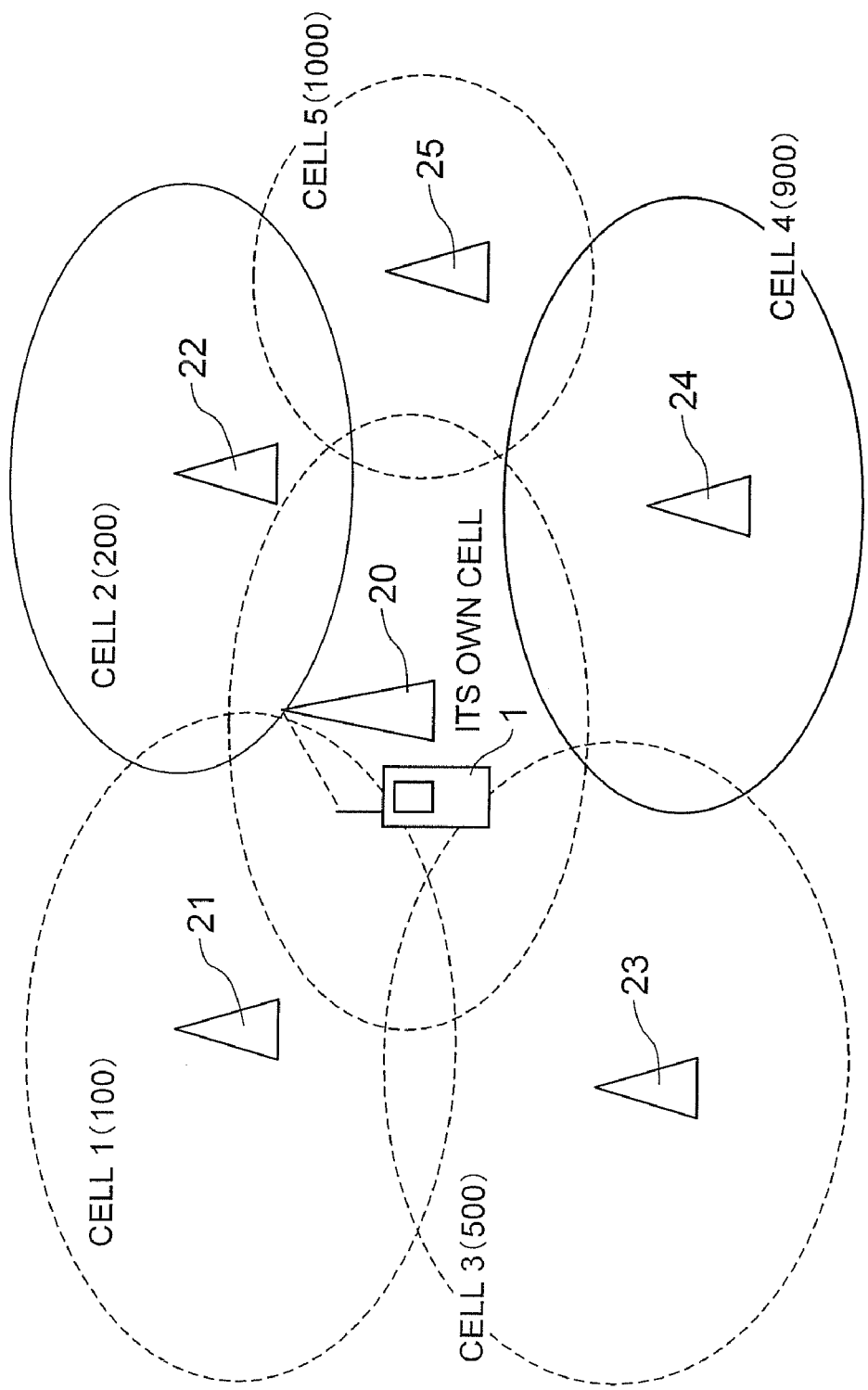
FIG. 7 is an illustration diagram showing a relationship between the portable telephone and the neighboring cells in the case of FIG. 5.
Figure 8:
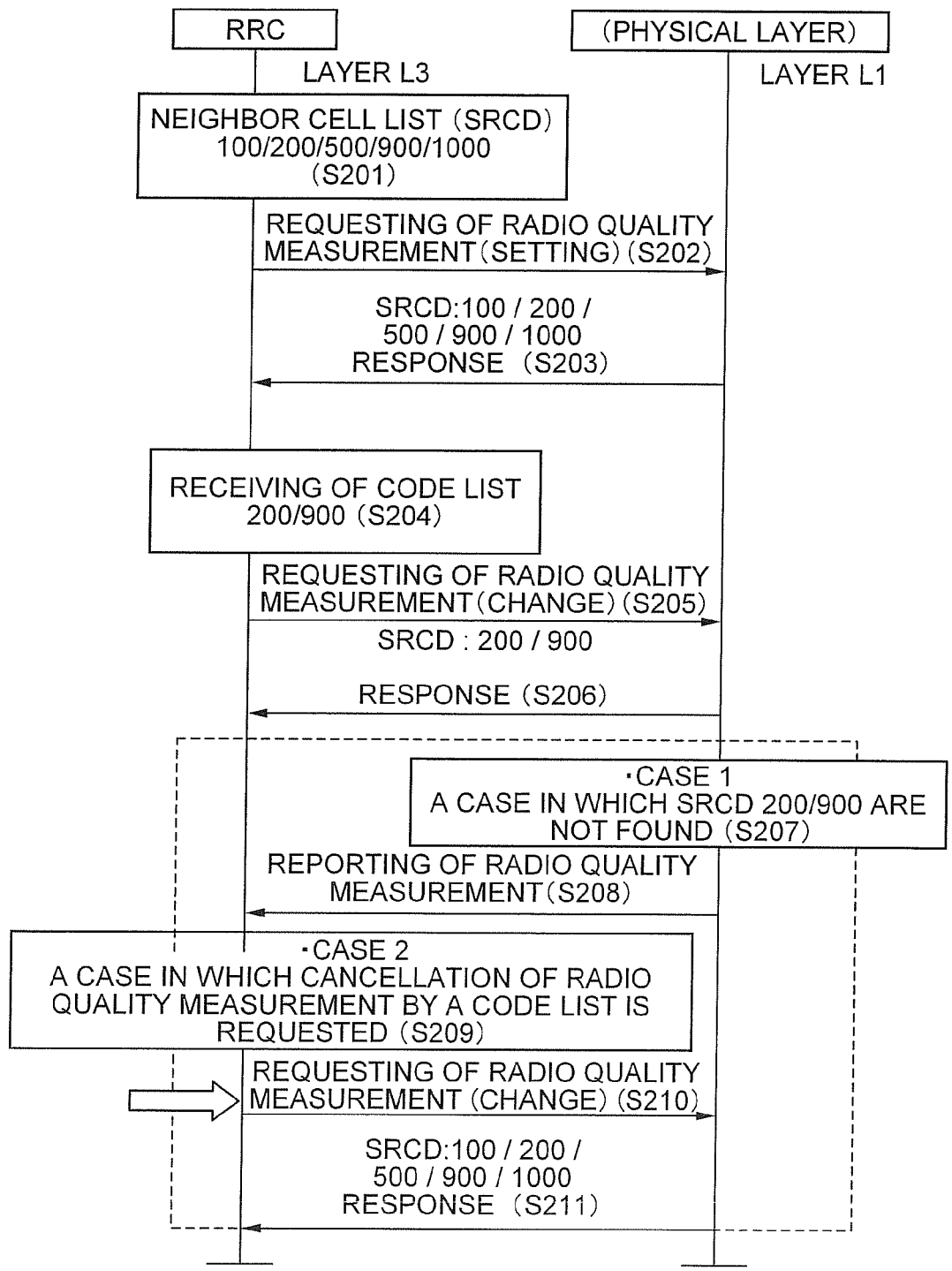
FIG. 8 is a sequence diagram showing the process in which a radio resource control layer requests a physical layer to measure radio quality.

DESCRIPTION OF REFERENCE NUMERALS 1, 31 portable telephone
2, 2A and 2B radio base station
3 radio network controller
4 core network
6 network
10 portable telephone communication system
20 to 25 radio base station

The invention claimed is:

1. A portable telephone communication system comprising:
   a plurality of radio base stations having a notified information transmitting function of transmitting notified information including cell information managed by neighbor radio base stations to unspecific number of portable telephones; and
   a plurality of portable telephones having a cell selecting function of detecting a suitable cell on the basis of radio quality indicating suitability for communication, obtained from the received notified information, and selecting the cell as a cell to which the portable telephone itself belongs, wherein
   the plurality of radio base stations include both a radio base station of an upper-level version having a specific function and a radio base station of a lower-level version not having the specific function,
   a network is provided for transmitting a scrambling code list of the cells belonging to the radio base stations which correspond to a new function to the portable telephone on the basis of a code list transmitting function provided therein in advance, and
   each of the portable telephones has a code list requesting function of transmitting a request message to the network in order to obtain the scrambling code list, a function of managing undated neighboring cell information in which the cells belonging to the radio base station having the new function are updated by combining the neighboring cell information received from the radio base station with information of the scrambling code list transmitted from the network on the basis of the scrambling code list obtained from the network by transmitting the request message, and a mode selecting and setting function of selecting either an upper-level version communication mode in which only the radio base station of the upper-level version is an object of connection or a normal communication mode in which all of the radio base stations including both of the radio base stations of the upper and lower-level versions are objects of connection.

2. The portable telephone communication system as claimed in claim 1, wherein each of the portable telephones has a code list requesting function of requesting a scrambling code list including a scrambling code of a cell belonging to the radio base station of the upper-level version to a network to which each of the radio base stations is connected.

3. The portable telephone communication system as claimed in claim 2, wherein each of the portable telephones has a code list receiving function of receiving the scrambling code list transmitted from the network.

4. The portable telephone communication system as claimed in claim 3, wherein each of the portable telephones has an upper-level version communication mode selecting function of changing a mode so as to measure radio quality of the cell specified in the scrambling code list in a physical layer, for going into the upper-level version communication mode, when the portable telephone which is connected to the radio base station in normal communication mode in which all radio base stations are being object of connection at first receives the scrambling code list transmitted from the network.

5. The portable telephone communication system as claimed in claim 4, wherein each of the portable telephones has a non-detection case normal communication mode selecting function of measuring radio quality of neighboring cells included in the neighboring cell information obtained from the notified information and going into the normal communication mode in the case where the cell specified in the scrambling code list is not found in measuring radio quality of the cell specified in the scrambling code list for going into the upper-level version communication mode.

6. The portable telephone communication system as claimed in claim 5, wherein each of the portable telephones has a normal communication mode selecting function of canceling measurement of radio quality of the cell specified in the scrambling code list, measuring radio quality of neighboring cells included in the neighboring cell information and going into the normal communication mode in the case where the upper-level version communication mode is desired to be canceled.

7. The portable telephone communication system as claimed in claim 2, wherein each of the portable telephones has a code list managing function of managing both the neighboring cell information obtained from the notified information and the scrambling code list managed by each of the radio base stations.

8. A communication control method in a portable telephone communication system including a plurality of radio base stations, and one or more portable telephones connecting to one of the radio base stations so as to perform radio communication, wherein the plurality of the radio base stations include both a radio base station of an upper-level version having a specific function and a both a radio base station of a lower-level version not having the specific function, wherein a network is provided for transmitting a scrambling code list of the cells belong to the radio base stations which correspond to a new function to the portable telephone on the basis of a code list transmitting function provided therein in advance, the method comprising:
   a step of transmitting a request message to the network in order to obtain the scrambling code list and managing updated neighboring cell information in which the cells belonging to the radio base station having the new function are updated by combining the neighboring cell information received from the radio base station with information of the scrambling code list transmitted from the network on the basis of the scrambling code list obtained from the network,
   a specified cell radio quality measuring step of measuring, in each of the portable telephones, radio quality indicating suitability for communication of the cells specified in the scrambling code list; and
   a specified cell selecting step of selecting, in each of the portable telephones, a suitable cell as a cell to which the portable telephone itself belongs from the cells specified in the scrambling code list on the basis of the measured radio quality, whereby
   the portable telephone is controlled to be connected preferentially to the radio base station of the upper-level version when the communication with the radio base station of the upper-level version is impossible, the communication is established with the radio base station of the lower-level version.

9. The communication control method in the portable telephone communication system as claimed in claim 8, further comprising:
   an updated neighboring cell information managing step of managing, in each of the radio base stations, both neighboring cell information obtained on the basis of notified information and the received scrambling code list after performing the code list receiving step.

10. The communication control method in the portable telephone communication system as claimed in claim 8, further comprising: a radio quality re-measuring step of re-measuring, in each of the portable telephones, radio quality of the neighboring cell included in the neighboring cell information obtained from the notified information managed by each radio base station, which is functioned when the object cell is not found in the specified cell radio quality measuring step; and a neighboring cell reselecting step of reselecting, in each of the portable telephones, a cell managed by the radio base station having the highest radio quality which is measured in the radio quality re-measuring step as a cell to which the portable telephone itself belongs.

11. The communication control method in the portable telephone communication system as claimed in claim 8, further comprising: a specified cell measurement cancellation instructing step of instructing, in each of the portable telephones, the cancellation, which functions when the specified cell radio quality measuring is desired to be canceled, or, after performing the specified cell radio quality measuring step, the connection state with the cell specified in the scrambling code list is desired to be canceled; a radio quality re-measuring step of re-measuring, in each of the portable telephones, radio quality of the neighboring cell included in the neighboring cell information obtained from the notified information managed by each radio base station; and a neighboring cell reselecting step of reselecting, in each of the portable telephones, a suitable cell as a cell to which the portable telephone belongs on the basis of the radio quality measured in the radio quality re-measuring step.

12. A communication control program in a portable telephone communication system for causing a computer to execute: by each portable telephone forming a part of a portable telephone communication system comprised of a plurality of radio base stations and the plurality of portable telephones, a neighboring cell radio quality measuring function of measuring radio quality of a neighboring cell included in neighboring cell information obtained from notified information received from a radio base station; and a neighboring cell selecting function of selecting a suitable cell as a cell to which the portable telephone itself belongs on the basis of the measured radio quality, wherein a network is provided for transmitting a scrambling code list of the cells belonging to the radio base stations which correspond to a new function to the portable telephone on the basis of a code list transmitting function provided therein in advance, the communication control program causes a computer to execute:

a code list requesting function of transmitting a request message to the network in order to obtain the scrambling code list;

a function of managing updated neighboring cell information in which the cells belonging to the radio base station having the new function are updated by combining the neighboring cell information received from the radio base station with information of the scrambling code list transmitted from the network on the basis of the scrambling code list obtained from the network by transmitting the request message, and a mode selecting and setting function of performing an upper-level version communication mode in which only the radio base station of the upper-level version is an object of connection and a normal communication mode in which all of the radio base stations including both of the radio base stations of the upper and lower-level versions are objects of connection.

13. The communication control program in the portable telephone communication system as claimed in claim 12, causing a computer to execute an updated neighboring cell information managing function of managing both the neighboring cell information and the received scrambling code list.

14. The communication control program in the portable telephone communication system as claimed in claim 12, causing a computer to execute a neighboring cell measurement returning function of returning to measurement by the neighboring cell radio quality measuring function, when the object cell is not found in executing the specified cell radio quality measuring function and the measurement by the neighboring cell radio quality measuring function is desired to be canceled.

* * * * *